United States Patent [19]

van der Lely

[11] Patent Number: 4,765,637
[45] Date of Patent: Aug. 23, 1988

[54] AGRICULTURAL TRACTOR

[76] Inventor: Cornelis van der Lely, 7 Brüschenrain, Zug

[21] Appl. No.: 856,204

[22] Filed: Apr. 28, 1986

Related U.S. Application Data

[63] Continuation of Ser. No. 534,501, Sep. 21, 1983, Pat. No. 4,585,084.

[30] Foreign Application Priority Data

Sep. 21, 1982 [NL] Netherlands ........................ 8203654

[51] Int. Cl.⁴ ...................... A01B 59/043; A01B 49/02
[52] U.S. Cl. .................................. 280/411 R; 172/47; 172/451; 280/460 A
[58] Field of Search .................. 172/47, 134, 439, 443, 172/451, 624, 676, 677, 680; 280/408, 410, 411 R, 446 A, 456 A, 460 A, 461 A; 56/15.9, 16.1

[56] References Cited

U.S. PATENT DOCUMENTS

| | | | |
|---|---|---|---|
| 1,644,978 | 10/1927 | Childers | 180/24.08 |
| 3,133,397 | 5/1964 | Halls | 172/47 X |
| 4,124,079 | 11/1978 | Crow | 172/676 X |

FOREIGN PATENT DOCUMENTS

| | | | |
|---|---|---|---|
| 227293 | 3/1960 | Australia | 172/439 |
| 1008945 | 5/1957 | Fed. Rep. of Germany | 172/443 |
| 2805932 | 8/1978 | Fed. Rep. of Germany | |
| 2299204 | 8/1976 | France | |
| 2317153 | 2/1977 | France | |
| 2457630 | 12/1980 | France | |
| 941991 | 11/1963 | United Kingdom | |

OTHER PUBLICATIONS

"Off-Road Vehicle Review, Farm Tracter Design Highlights Seen at Smithfield and Elsewhere", *Automotive Engines*, Dec. 1980, pp. 18 and 20.

*Primary Examiner*—Richard T. Stouffer
*Attorney, Agent, or Firm*—Penrose Lucas Albright; Robert A. Miller

[57] ABSTRACT

Agricultural implements are adapted to be concurrently mounted to a three point lifting device of a tractor. Each implement is provided with three connecting elements, each with forked ends. The forked ends of one of the implements have tines separated a greater distance than the tines of the corresponding forks of another agricultural implement, so that the forked ends of one of the implements straddle the corresponding forked ends of another implement. In this way, the implements can be concurrently mounted on the lifting arms of the three point device.

5 Claims, 6 Drawing Sheets

AGRICULTURAL TRACTOR

RELATED APPLICATIONS

This is a continuation of application Ser. No. 534,501 filed Sept. 21, 1983, issuing as U.S. Pat. No. 4,585,084 on Apr. 29, 1986.

SUMMARY OF THE INVENTION

This invention relates to an agricultural tractor comprising an engine and a plurality of ground wheels.

According to the present invention, agricultural implements are adapted to be concurrently mounted on a three point lifting device of the tractor. Each implement is provided with three connecting elements, each with forked ends. The forked ends of one of the implements have tines separated a greater distance than the tines of the corresponding forks of another agricultural implement, so that the forked ends of one of the implements straddle the corresponding forked ends of another implement. In this way, the implements can be concurrently mounted on the lifting arms of the three point lifting device.

For a better understanding of the present invention and to show how it may be carried into effect, reference will now be made, by way of example, to the accompanying drawings, in which:

BRIEF DESCRIPTION OF THE DRAWINGS

FIG. 6 is a plan view on an enlarged scale of a coupling between a lifting device of the tractor and the implements.

DESCRIPTION OF THE PREFERRED EMBODIMENTS

Figure 1:
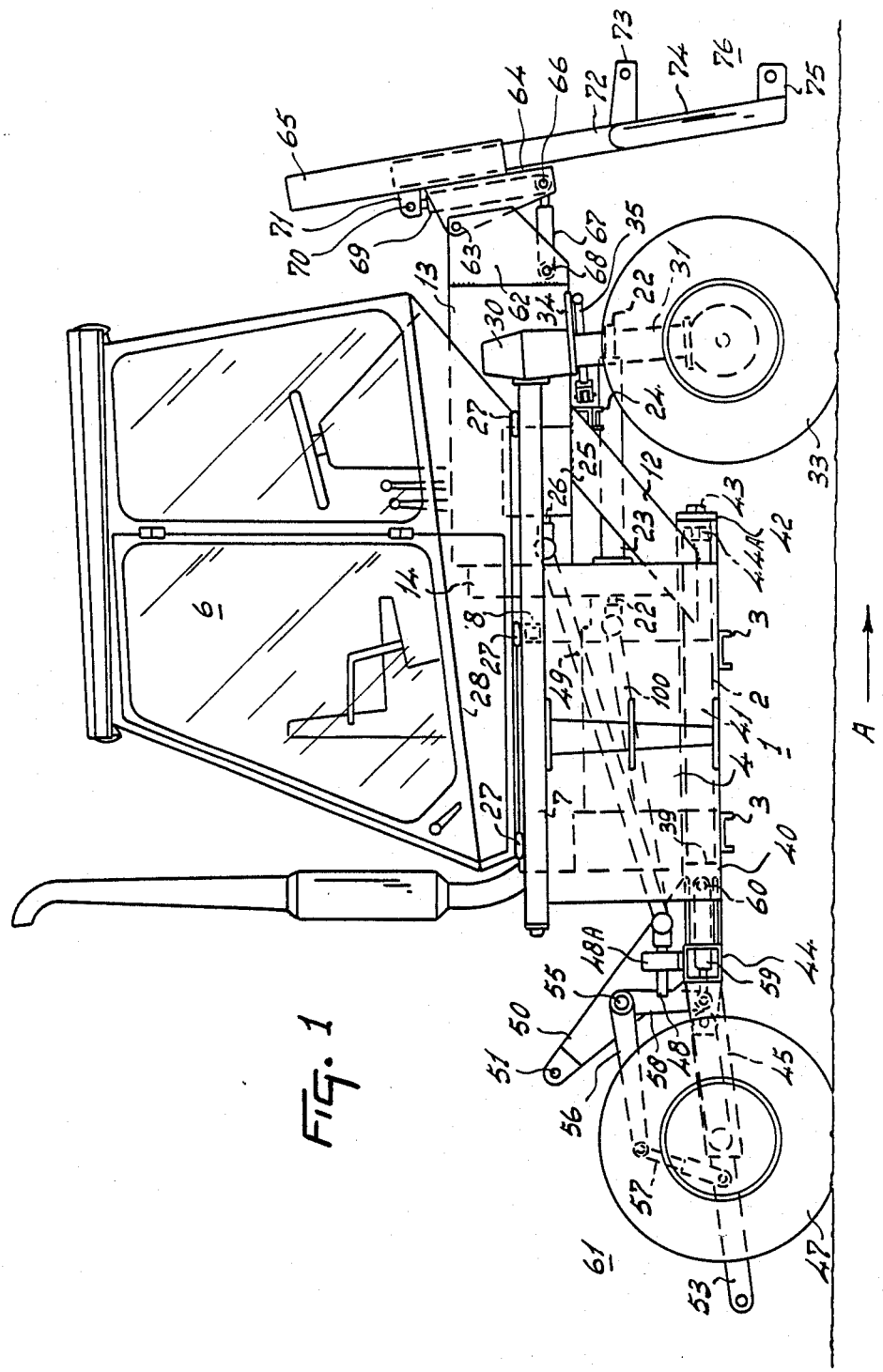
FIG. 1 is a elevational side view of a tractor.
Figure 2:
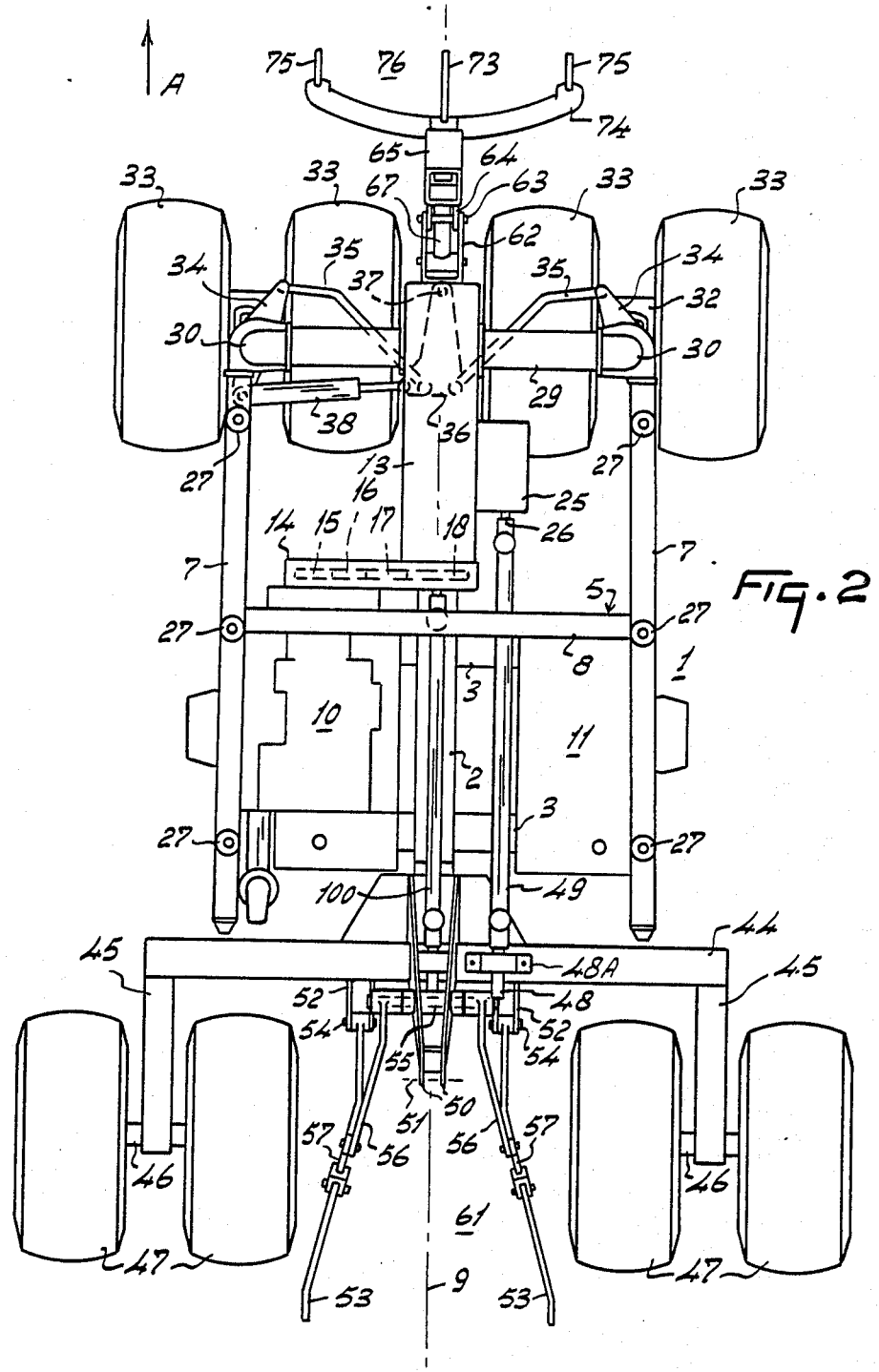
FIG. 2 is a plan view of the tractor of FIG. 1.
Figure 3:
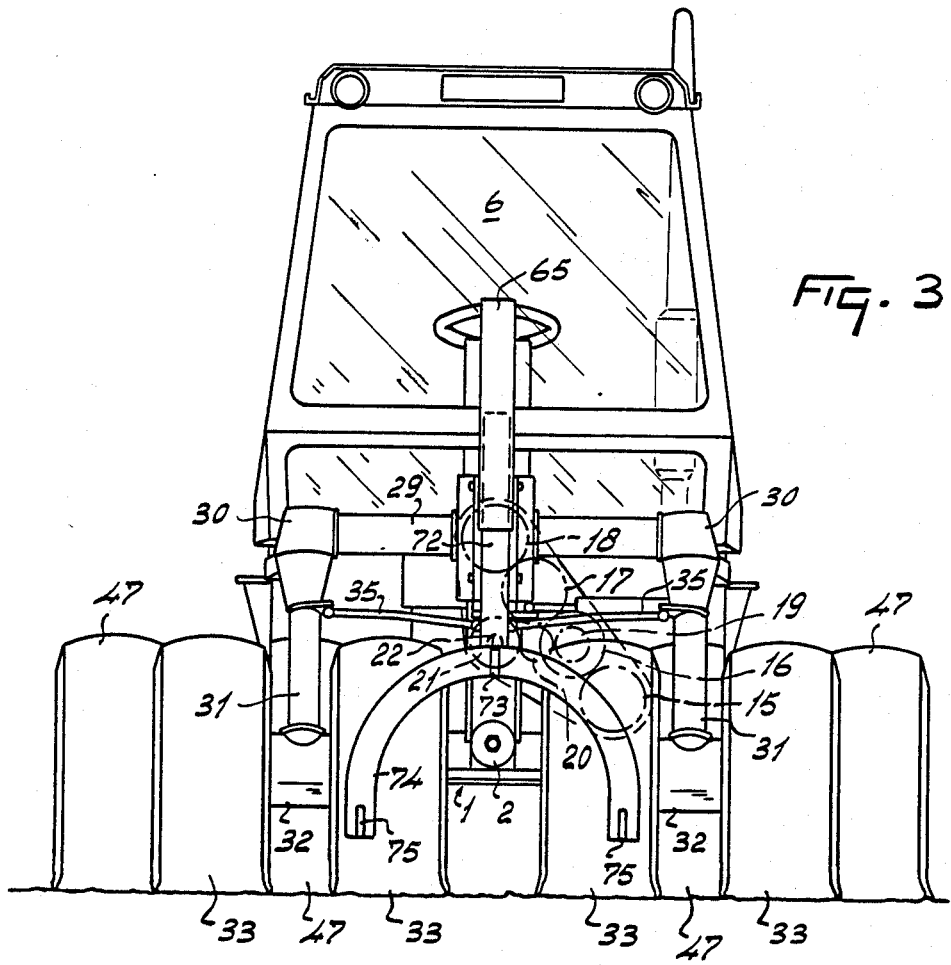
FIG. 3 is a front view of the tractor of FIGS. 1 and 2.

The tractor shown in the Figures has a frame 1 mainly comprising a horizontal, hollow tube 2 extending in the intended direction of operative travel of the tractor, as indicated by an arrow A. The tube 2 is situated at the bottom of the frame and is provided with two horizontal carriers 3 extending transversely of the direction A. The carriers 3 are spaced apart from each other and their outer ends are fastened to upright cover plates 4 which are directed in the directed A and, as viewed from the side (FIG. 1) are rectangular. The upper edges of the cover plates are secured to the lower edges of an H-shaped frame part 5, which is shown in plan in FIG. 2. The frame part 5 has a relatively light-weight tubular construction, since its main function is to support only a cab 6 (omitted in FIG. 2 for the sake of clarity). As shown in FIG. 2, the frame part 5 comprises two tubes 7 located one on each side of the tractor and interconnected midway along their length by a tube 8 which extends horizontally and transversely of the direction A. The construction comprising the parts 1 to 8 is symmetrical about the vertical central, longitudinal plane of the tractor, which is designated in FIG. 2 by reference numeral 9. The center line of the main frame tube 2 is thus also located in the plane 9. FIG. 2 shows a driving engine 10 disposed to one side of the plane 9 and supported by the carriers 3. At the rear of the engine 10 there is a radiator. On the other side of the plane 9, there is a fuel tank 11 which is supported by the carriers 3. Near the front end of the main frame tube 2 there are two rigid supports 12 which are fastened on the sides of the tube 2 and slope upwardly and forwardly from the tube 2 at an angle of about 45°. The top ends of the supports 12 are fastened to the underside of a box or housing 13 for a combined change speed and differential gear, which, as shown in FIG. 1, is disposed mainly ahead of the front end of the tube 2. The horizontal underside of the housing 13 is approximately at the level of the top of the engine 10, which is situated, as shown in FIG. 1, behind the housing 13. The output shaft of the engine 10 extends forwardly and is coupled with the input shaft of a gear wheel transmission 14 accommodated in a rigid housing which slopes upwardly from the engine towards the plane 9, as can be seen in FIG. 3. The directional disposition of the housing of the gear wheel transmission 14 is because engine 10 is disposed to one side of the plane 9 and at the lowest possible level with respect to the frame 1 with regard to the position of the center of gravity of the tractor. The output shaft of the engine 10 drives a gear wheel 15 (FIG. 3), which drives a gear wheel 16 situated obliquely above it. The gear wheel 16 drives a gear wheel 18 through the intermediary of a gear wheel 17. The rotary axis of the gear wheel 18 lies in the plane 9. The shaft of the gear wheel 18 emerges forwardly from the housing of the gear wheel transmission 14, and is coupled with an input shaft of the change-speed gear box 13. The gear wheel 16 is mounted on the same shaft as a gear wheel 19. Through an intermediate gear wheel 20, the gear wheel 19 drives a gear wheel 21, the rotary axis of which lies in the plane 9 below the gear wheel 18. All of the gear wheels 15 to 21 are mounted in the rigid housing which connects the engine with the change-speed gear box 13. The rotary shaft of the gear wheel 21 projects both to the front and to the rear from the housing of the gear box and is integral with a drive shaft 22 journalled in a horizontal, bearing tube 23 lying in the plane 9 below the underside of the housing of the change-speed gear box 13 (FIG. 1). The bearing tube 23 is disposed below the change-speed gear box 13 and in front of the housing of the gear wheel transmission 14. The rear end of the bearing tube 23 is rigidly secured to the front of the housing of the gear wheel transmission 14 and is connected by a support 24 to the underside of the gear box 13 at a position ahead of the gear wheel transmission 14. The drive shaft 22 accommodated inside the bearing tube 23 projects from the pipe 23 both at the front and the rear side of the housing of the gear wheel transmission 14 (FIG. 1). The front end of the H-shaped frame part 5 embraces the housing of the change speed and differential gear box 13. As shown in FIG. 1, the tie beam 8 of the frame part 5 is situated a short distance behind the front end of the tube 2.

To one side of the housing of the gear box 13 is fastened a drive casing 25 having an output shaft 26 directed to the rear. The mechanism accommodated in the drive casing 25 and driving the output shaft 26 is coupled with an output shaft of the mechanism in the gear box 13 so that the output shaft 26 can be driven with a rotary speed which is proportional to the travel speed of the tractor. The drive shaft 22, however, is driven at a speed which does not vary with the travel speed of the tractor, but is proportional to the speed of rotation of the output shaft of the engine 10.

Three resilient mountings 27 of synthetic resin or rubber are arranged one behind the other on the top of each of the two tubes 7 of the H-shaped frame part 5 for supporting the tractor cab 6. The tractor cab 6 accommodates a driver's seat and steering means for the steerable wheels which will be described more fully later, and also accommodates control members for controlling drive to the wheels and preferably also for connecting and disconnecting drive to the drive shaft 22 and the output shaft 26 by means of clutches (not shown) situated respectively near the drive shaft 22 at the housing of the gear wheel transmission 14 and in the drive casing 25. As shown in FIG. 1, the cab 6 comprises sidewalls with panes terminating at lower edges which lie on a boundary line 28 which slopes upwardly towards the front so that the rear wall of the cab extends only for a short distance above the frame part 5, this enabling the driver to get a good view of the rear part of the tractor. The boundary line 28 terminates at the front a short distance above the top of the gear box 13 so that the driver also gets a good view through the front pane of the cab 6 of the front part of the tractor. As shown in FIG. 1, the front plane of the cab terminates approximately vertically above the front of the gear box 13.

Tubular carriers 29 are secured to the sides of the housing of the gear box 13 at a position a short distance behind the front of this housing. These carriers 29 are disposed symmetrically about the plane 9. At their ends away from the housing of the gear box 13 the carriers 29 each terminate at the level of the front ends of the tubes 7 of the horizontal H-shaped frame part 5. Near these ends, the carriers 29 are fastened to housings 30 of gear wheel transmissions which will be described in detail later. Tubular supports 31 are connected to the underside of the housings 30 and extend from the housings 30 downwardly and slightly to the front, their centerlines being inclined at an angle of about 80° to the horizontal. The tubular supports 31 are pivotable about their longitudinal center lines with respect to the housings 30 in a manner to be described more fully later. At their lower ends the supports 31 are provided with wheel carriers 32, which are rigidly connected to their supports 31. The wheel carriers 32 are also tubular and extend horizontally and transversely of the direction A when in the position shown in FIG. 3, which corresponds to straight-ahead travel. Each wheel carrier 32, as can be seen in FIG. 3, is symmetrical about a vertical plane parallel to the plane 9. At least one front wheel 33 is mounted on each end of each wheel carrier 32 so that the tractor has, in all, at least four front wheels arranged in a row transverse to the direction A. The diameter of each front wheel is about 1.3 meters or less, although not less than about ninety centimeters, and the width of the pneumatic tire on each front wheel is about forty centimeters. The tops of the wheels 33 are approximately level with the top of the engine 10. The contact surface of all front wheels 33, as shown in the front view of FIG. 3, thus covers a width of at least 1.60 meters or, if more than four front wheels are provided, more than 1.60 meters.

The differential gear in the housing 13 has two output shafts which extend into the carriers 39 and drive bevel gear wheel transmissions in the housings 30 in a manner such that shafts located in the supports 31 drive bevel gear wheel transmissions arranged in the wheel carriers 32, the output shafts of which are coupled with the front wheels on each wheel carrier 32. The rotary axes of the front wheels 33 thus driven coincide with the centerlines of the wheel carriers 32. The supports 31 are journalled in the housings 30 so that the supports 31, with the associated wheel carriers 32 and the associated front wheels 33, are pivotable about the centerlines of the supports 31, these centerlines also coinciding with the centerlines of the drive shafts accommodated within the supports 31 for transmitting the drive to the front wheels 33. At their top ends the supports 31 are provided with levers 34, which are forwardly and inwardly inclined and are pivotally coupled at their ends away from the supports 31 with track rods 35, which extend inwardly from the levers 34 and are inclined to the rear. At their inner ends the track rods 35 are pivotally coupled with the rear corners of a triangular steering plate 36 (FIG. 2) which is pivotable about an upwardly directed pivotal shaft 37 with respect to the housing of the gear box 13, shaft 37 thus being rigidly secured relative to the frame 1. The pivotable shafts at both ends of the track rods 35 and the pivotable shaft 37 are preferably parallel to the centerlines of the supports 31. The rear end of the steering plate 36 is also pivotally connected to the end of the piston rod of a hydraulic ram 38, the cylinder of which is pivotable about an upwardly directed pivotal shaft with respect to the frame part 5 and one of the housings 30. The hydraulic ram 38 is situated a short distance behind one of the housings 30 and can be actuated from the cab 6. Viewed on plan (FIG. 2) the track rods 35 intersect a line perpendicular to the plane 9 and connecting the housings 30, the pivotable connections between the track rods and the steering plate 36 being located to the rear side of this connecting line. Apart from being steerable, the front wheels 33 are arranged on a carrying construction comprising the parts 29, 30, 31, 32, which is fixed with respect to the tractor frame 1. The distance between the steering axes and the engine 10 is substantially equal to the diameter of each front wheel.

The front end of the drive shaft 22 is positioned, as shown in FIG. 1, approximately in a plane containing the centerlines of the supports 31 and at the level of the tops of the front wheels 33. As seen from the front, the front end of the drive shaft 22 lies within the carrying construction comprising the parts 29, 30, 31, of the front wheels 33, this construction being generally in the form of an inverted U. Viewed from the side, the cab 6 extends forwardly beyond the rotary axes of the front wheels 33.

The rear end 39 of the main frame tube 2 is situated, as viewed from the side, approximately directly below the rear boundary of the cab 6. A length of cylindrical tube 40 is joined to the rear end 39 of the main tube 2. The front end of the length of tube 40, i.e. near the rear end 39, is closed by a strong partition which is locally welded to the inner periphery of the tube 40. To the front side of the partition is welded a cylindrical tube 41 which extends through the tube 2 up to its front end. The outer periphery of the tube 41 is a close fit in the inner periphery of the tube 2 so that the length of tube 40 and the tube 41, which are integral with one another, are rotatably journalled in the tube 2. The centerlines of the length of tube 40, the tube 41 and the tube 2 coincide with each other. A patition 42 is welded to the front of the tube 2 and has a central hole through which a bolt 43 extends. The part of the bolt 43 located inside the tube 2 is screwed into a tapped hole in a partition 44A which is located in the front end of the tube 41 and is welded at its periphery to the inner wall of the tube 41. The bolt 43 prevents the length of tube 40 from sliding rearwards in the pipe 2 and also permits adjustment of the contact pressure between the front end of the length of tube 40 and the rear end 39 of the tube 2. The rear end of the length of tube 40 is substantially directly below the rear end of the tube 7 supporting the cab 6 (FIG. 1). In the construction described above, the length of tube 40, together with the tube 41, is pivotable with respect to the main frame tube 2.

To the rear end of the length of tube 40 is welded a beam 44, which may be tubular, which extends transversely of the direction A and, when the tractor is standing on a horizontal surface, is symmetrical about the plane 9. Each end of the beam 44 lies in a plane which is parallel to the plane 9 and approximately coincides with, or lies outside, the vertical plane of symmetry of the outermost front wheel on the same side of the plane 9. At these outer ends, the rear of the beam 44 is provided with carriers 45 which extend rearwardly and slope slightly downwards. Near the rear end of each carrier 45 is fastened a rotary shaft 46 which is parallel to the length of the beam 44 and projects to both sides of the respective carrier 45. At least one rear wheel 47 is rotatably mounted on each end of each of the rotary shafts 46, so that each carrier 45 has two rear wheels 47, disposed one on each side. The wheels 47 of each pair are mounted so that they are freely rotatable independently of the other.

The four front wheels 33, like the four wheels 47, are arranged in a row transverse of the direction A, the disposition of the two rows being such that, as viewed parallel to the direction A, each of the outer front wheels 33 is located between the rear wheels 47 located on one side of the plane 9 so that, as seen in FIG. 2, the vertical plane of symmetry of each carriers 45 substantially coincides with the vertical plane of symmetry of an outermost front wheel 33. Each of the inner front wheels 33 is arranged so that, again viewed in the direction A, it is disposed substantially between the plane 9 and the inner rear wheel 47 on the same side of the plane 9. This is apparent from the front view of the tractor (FIG. 3), which shows that the wheels are in contact with the ground substantially over the entire width of the tractor so that the weight of the tractor is distributed over the entire width of the tracks. Measured transversely of the direction A, the overall dimension of the row of rear wheels 47 is about three meters. The diameter of all wheels is substantially the same and amounts to about 1.3 meters of less (but not less than about ninety centimeters), the width of each wheel being about 40 cms.

The rear wheels 47 together with the carriers 45, the beam 44 and the length of tube 40 with the tube 41 are pivotable about the centerlines of the tube 2 with respect to the tractor frame and also with respect to the front wheels 33.

On the top of the hollow beam 44, which is square in this embodiment, there is a support 48A, which is the same distance from the plane 9 as is the output shaft 26 of the drive casing 25. A shaft 48 is received in the support 48A and projects from the front and rear of the support 48A. The shaft 48 is substantially horizontal and parallel to the plane 9. The forwardly projecting part of the shaft 48 is coupled by a drive shaft 49 including two universal joints with the output shaft 26 of the drive casing 25 so that the shaft 48 can be driven at a rotary speed proportional to the rotary speed of the driven front wheels 33 and hence also to that of the non-driven rear wheels 47. Two support plates 50 are secured to the top of the beam 44 near the plane 9. These support plates 50 are close to each other and extend upwardly and to the rear away from the beam 44. Near their free ends, the support plates 50 have fastening holes 51, for attaching an upper lifting arm. Viewed from the side, the holes 51 are located close to a vertical plane touching the front points of the wheels 47. Fastening lugs 52 are rigidly secured to the rear of the beam 44 on both sides of the plane 9. Lower lifting arms 53 are pivotally fastened to the lugs 52 and extend rearwardly from the lugs 52. The lifting arms 53 are slightly inclined outwardly and are symmetrical about the plane 9. The lifting arms 53 are pivotable relatively to the lugs 52 about pivotal shafts 54 which extend parallel to the beam 44. Viewed from the side, the pivotal shafts 54 are situated near the front points of the rear wheels 47.

A shaft 55, extending parallel to the beam 44, is journalled in the support plates 50, at a position above the pivotal shafts 54 and above the beam 44. That shaft 55 projects from the support plates 50 at both sides and is rigidly secured near its ends to levers 56 which extend to the rear, in the position shown in FIG. 1, from the respective end of the shaft 55 to a position approximately above the rotary axes of the rear wheels 47. The rear end of each lever 56 is pivotally connected by a downwardly extending lifting arm 57 to the adjacent neighboring lower lifting arm 53. The levers 56 and the lifting arms 57 are symmetrical about the plane 9. Near its center located in the plane of symmetry 9 the shaft 55 is rigidly secured to a lever 58, which extends downwards from the shaft 55 near to the beam 44, where it is pivotally connected to the end of the piston rod of a hydraulic ram 59 accommodated in the length of the tube 40. The ram 59, which can be actuated from the driver's cab 6, is pivotally connected near its front end to the length of tube 40 by a horizontal pivotal shaft 60 which is transverse of the direction A. Suitable openings are provided in the front and rear walls of the beam 44 to receive the ram 59 with its piston rod. By actuating the hydraulic ram 59 the lower lifting arms 53 can be moved upwards and downwards by the lever 58, the two levers 56 and the two lifting arms 57. The lifting arms 53 and a top rod pivotally connectable in the fastening holes 51 of the support plates 50 constitute a three-point lifting device 61.

At the front of the tractor the of the change-speed and differential gear housing 13 has fastened to it two support plates 62, which are disposed at a short distance from the plane 9 and extend forwardly. A holder 64 is pivotable about a pivotal shaft 63 located near the front and top edges of the support plates 62 at the level of the top of the gear box 13. The holder 64 is welded at the front to the rear of an upwardly directed, hollow tube 65, which slopes to the rear from bottom to top in the position shown. Near its lower end the holder 64 is provided with a pivotal shaft 66, about which one end of a hydraulic ram 67 is pivotable. The other end of the ram 67 is pivotable about a pivotal shaft 68 which is disposed between the plates 62 near the front of the housing of the gear box 13. The hydraulic ram 67 is substantially horizontal and extends forwardly away from the pivotal shaft 68. One end of a hydraulic ram 69 is also pivotable about the pivotal shaft 55, the ram 68 being mounted between two limbs of the holder 64 extending upwardly from the pivotal shaft 66. The top end of the piston rod of the hydraulic ram 69 is pivotally connected by a pivotal shaft 70 to a support 71, the front of which is rigidly welded to a tube 72 which is accommodated at least partly inside the tube 65 and is telescopically slidable up and down in the tube 65. For this purpose the rear side of the tube 65 has a slot extending parallel to its centerline, through which slot the support 70 projects to the rear. The tube 72, which, like the tube 65, preferably has a rectangular cross-section, projects from the bottom end of the tube 65 and is rigidly connected by a fastening lug 73 with an arcuate tube 74, the centerline of which is located in a plane at right angles to the plane 9. As can be seen in FIG. 3, the tube 74 is curved in the form of a semi-circle and from the region where it is connected to the pipe 72 it extends downwardly, symmetrically with respect to the plane 9. A fastening lug 75 is provided near each lower end of the tube 74. The two fastening lugs 75 and the fastening lug 73 have at their ends fastening holes for attaching machines or implements to the tractor so that the construction 72 to 75 constitutes a three-point lifting device 76. The pivotal shafts 63, 66, 68 and 70 are parallel to each other and at right angles to the plane 9. As seen in the front view of FIG. 3, the fastening lugs 75 of the lifting device 76 are positioned in front of the inner front wheels 33. As seen in FIG. 1 the lifting device 76 is disposed near the front sides of the front wheels 33.

Figure 4:
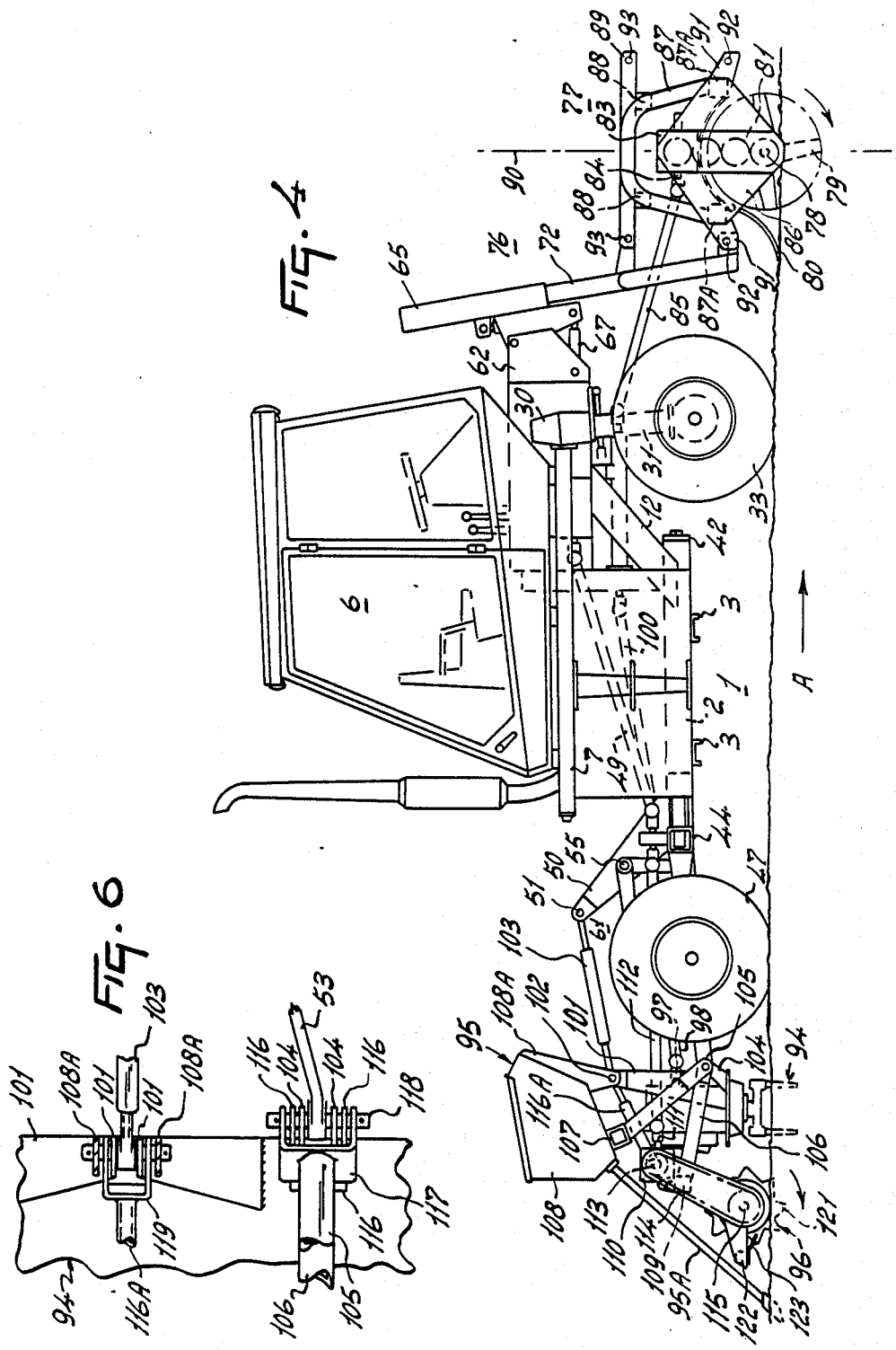
FIG. 4 is a side elevational view of the tractor of FIGS. 1 to 3 with implements hitched to it.
Figure 5:
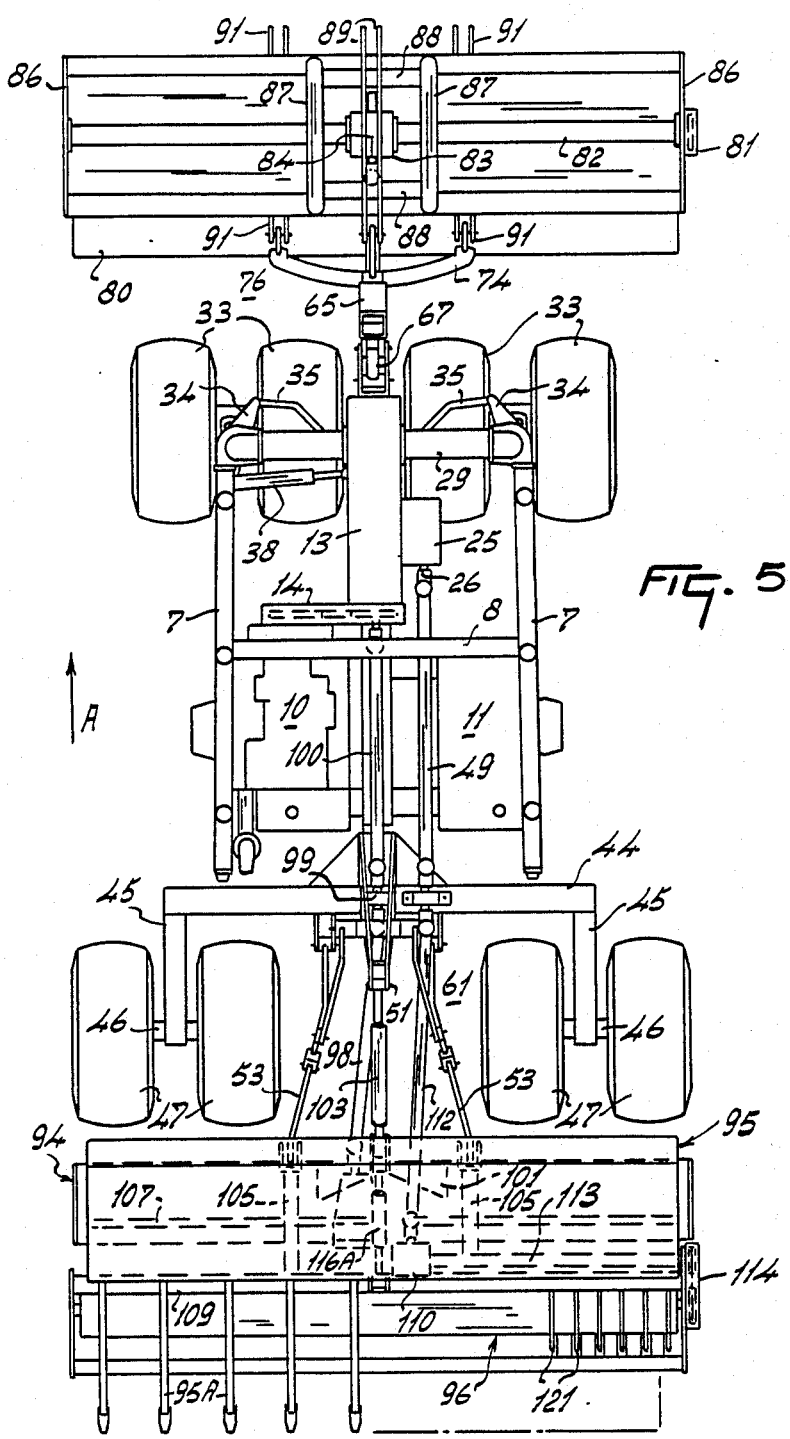
FIG. 5 is a plan view of the tractor and implements of FIG. 4.

In the arrangement shown in FIGS. 4 and 5, machines or implements are attached to both the front lifting device 76 and the rear lifting device 61. The whole assembly of FIGS. 4 and 5 constitutes agricultural machinery in which the tractor constitutes the prime mover.

In the agricultural machinery shown in FIGS. 4 and 5 the front lifting device 76 is connected to a soil cultivator 77 comprising a horizontal shaft 78, extending transversely of the direction A, to which is fastened throughout its length (which is about three meters in this embodiment) cultivator bodies 79. This operative part of the soil cultivator 77 is covered over its entire effective length by an arcuate cover plate 80 which, at the rear, is curved towards a horizontal position, this cover plate 80 bearing on the worked soil surface during operation. The shaft 78 can be driven through a gear box 81 extending upwardly from one end of the shaft 78 and disposed on one side of the cultivator 77. The input to the gear box 81 comprises a drive shaft 82 disposed on top of the cultivator and extending transversely of the direction A (FIG. 5). The shaft 82 is drivable through a gear box 83 from an input shaft 84. The input shaft 84 is coupled by an auxiliary shaft 85 including universal joints with the front end of the drive shaft 22 of the tractor. As mentioned above, the drive shaft 22 can be driven at a rotary speed proportional to the rotary speed of the output shaft of the engine 10 of the tractor.

The gear box 81 of the soil cultivator 77 is supported by a side plate 86, and another side plate is provided at the other end of the cultivator. The two side plates 86 are supported at the front and rear by beams 87A. The two beams 87A are at right angles to the plane 9, and are interconnected by two relatively spaced, curved tubes 87 which are disposed side by side symmetrically with respect to the gear box 83 and to the plane 9. The two tubes 87 are interconnected near their tops by tie beams 88 which are parallel to the shaft 78. Near the plane 9 there are two parallel, vertical supporting plates 89 which extend in the direction A and are rigidly secured to the tie beams 88. As shown in FIG. 4, the tubes 87, the tie beams 88 and the supporting plates 89 are symmetrical about a vertical plane 90 which goes through the shaft 78 and is at right angles to the plane 9. On the rear side of the rear beam 87A and also on the front side of the front beam 87A there are supporting plates 91 which are rigidly secured to the respective beam 87A. The supporting plates 91 have fastening holes 92 for attaching the soil cultivator 77 to the lifting device of a prime mover. Near the two ends of the supporting plates 89 there are fastening holes 93 for attaching the cultivator to the top point of a three-point lifting device. The vertical distance between supporting plates 91 and the supporting plates 89 corresponds to that between the upper and lower fastening tags 73 and 75 of the lifting device 76. As shown in FIG. 4, the three coupling points 92, 93 on one side of the cultivator 77 and those on the other are disposed symmetrically about the plane 90 so that the cultivator 77 can be attached to a three-point lifting device either at its front or rear. Obviously it is possible in an analogous manner to construct other types of agricultural machines or implements with such dual coupling capability. In the embodiment shown in FIG. 4, the fastening holes 93 are disposed, as viewed from the side, directly above the respective fastening holes 92, but this is not essential.

FIG. 4 shows three machines attached to the rear of the tractor, these being a rotary harrow 94 having soil working members which are drivable about upwardly directed axes, a seed drill 95 disposed above the harrow 94, and a drivable roller 96 arranged behind the harrow 94 and partly below the seed drill 95 and serving inter alia as a crumbling roller for breaking up lumps of earth. The attached implements such as the harrow 94, the seed drill 95 and the roller 96 cover approximately the width of the tractor.

The harrow 94 has an input shaft 97 lying close to the plane 9 and coupled by an auxiliary shaft 98 including universal joints with a stub shaft 99 journalled between the supporting plates 50 on top of the beam 44 (FIG. 5). The front end of the stub shaft 99 is drivably connected by an auxiliary shaft 100 provided with universal joints with the rear end of the drive shaft 22, which is drivable at a rotary speed proportional to that of the engine 10. The auxiliary power take-off shafts 99, 48 and 22 as well as the drivable wheels are driven by means of parallel connected mechanical drives.

The harrow 94 is provided midway along its length with an upwardly directed, substantially triangular trestle 101, which, near its top end, has a fastening hole 102 for attachment of a top rod 103 of the lifting device 61. Near the two sides of the trestle 101 the main frame of the harrow is provided with supports 104 for coupling the harrow 94 with the lower lifting arms 53 of the tractor. Two further supporting beams 105 and 106 cooperate with each of the supports 104. The supporting beams 105 support the seed drill 95 and the supporting beams 106 support the drivable roller 96. The two supporting beams 105 located one on each side of the plane 9 are upwardly and rearwardly inclined from their lower coupling points and extend up to a carrying beam 107 supporting a seed hopper 108 which extends over the length of the seed drill 95 (about three meters). The supporting beams 105 are preferably rigidly secured to the rest of the seed drill 95. The dimensions are such that the two supporting beams 105 extend above the harrow 94. At the front and near the plane 9, the seed hopper 108 is provided with a support 108A by which the seed drill 95 can be coupled both with the top end of the trestle 101 and the top rod 103.

The supporting beams 106 associated with the drivable roller 96 and being arranged symmetrically about the plane 9 extend rearwardly and are slightly upwardly inclined from their connection with the lower lifting arms 53. They extend up to a carrying beam 109 comprising a frame beam for the roller 96. The supporting beams 106 are preferably rigidly secured to the frame of the drivable roller 96. One one side of the plane 9 and at a short distance from it, there is a gear box 110 of the roller 96 which is supported by the carrying beam 109 of the frame of the roller 96. The gear box 110 comprises a speed reduction mechanism through which the roller 96 can be driven. An input shaft 111 of the gear box 110 is drivably connected by an auxiliary shaft 112 provided with universal joints to the rear end of the shaft 49 of the tractor which can be driven by the driving shaft 49 with a rotary speed proportional to the travel speed of the tractor. The gear box 110 has an output shaft which is connected by a drive shaft 113 at right angles to the plane 9 with an input shaft of a drive casing 114, which extends downwardly and to the rear from the shaft 113 towards a main shaft 115 of the drivable roller 96. The drive casing 114 contains a chain drive through which the rollers 96 can be driven with a peripheral speed approximately equal to or slighly higher than the travelling speed of the tractor. The speed of the output shaft of the change-speed gear box 13 is reduced for this purpose in the driving casing 25 of the tractor, in the speed reduction mechanism 110 and in the drive casing 114.

Near the plane 9, the frame of the drivable roller 96 has pivoted to it a rod 116A of adjustable length, which extends from the top of the harrow 94 and the underside of the seed drill 95 up to the upper coupling point of the trestle 101 and of the seed drill 95 for fastening to the top rod 103 of the lifting device 61. The seed drill 95 is provided with a rod of seed tubes 95A, which slope downwardly and rearwardly from the seed hopper 108 and enter the soil behind the drivable roller 96.

From the above description it will be clear that the fastening points of three machines to the top rod 103 and to the lower lifting arms 53 of the three-point lifting device 61 substantially coincide. For this purpose the fastening points are designed as is shown in FIG. 6 on an enlarged scale. In this way, the attachment of one or more machines does not require coupling points of another machine fastened to the same lifting device, which would consequently have to be more complicated and heavier. In FIG. 6, a pair of supports 104 of the harrow 94 located on one side of the plane 9 are shown which are each designated by reference number 104. These supports 104 are surrounded by a fork 116 fastened to the supporting beam 106 of the drivable roller 96. The fork 116 is surrounded in turn by a fork 117 fastened to the end of the supporting beam 105 of the seed drill 95. This is possible because the supports 104, the supporting beam 106 and the supporting beam 105 are always inclined to each other, as will be apparent from FIG. 4. The supports 104 and the forks 115 and 116 are connected by a pin 118 to the rear end of the associated lower lifting arm 53. At the top, the trestle 101 provides supports designated in FIG. 6 also by reference numeral 101. Outside supports 101 there is a fork 119 fastened to the rod 116A which connects the roller 96 to the top rod 103. Outside the fork 119 there are the two supporting plates 108A (FIG. 4) which connect the seed hopper 108 to the tp rod 103 of the lifting device 61. If the seed drill 95 and the drivable roller 96 were provided with supports 105 and 106 respectively pivotally fastened to the associated machine, the multiple coupling proposed would also be possible. For such case, viewed from the side, triangular linkages are created, which are stronger and more resistant to deformation.

Figure 7:
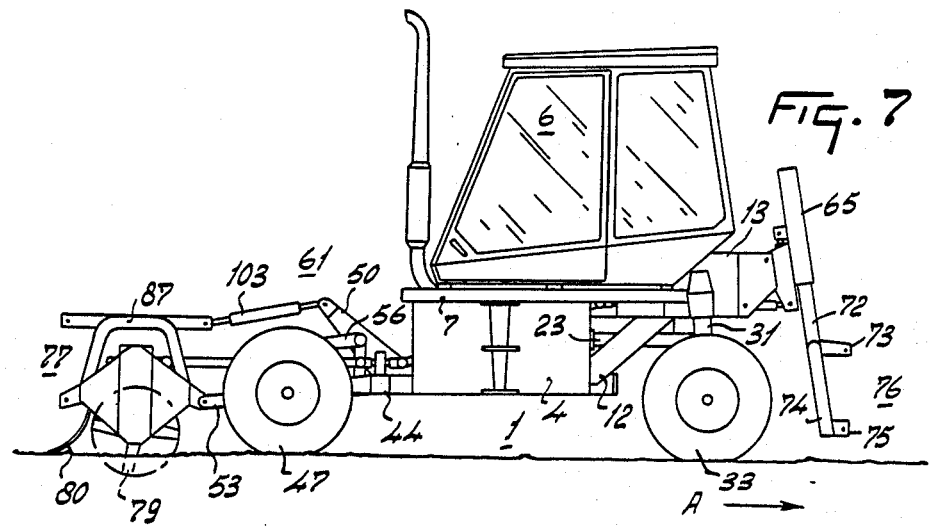
FIGS. 7 to 9 are side elevational views of three possible combinations of the tractor of the preceding Figures with attached machines or implements.
Figure 8:
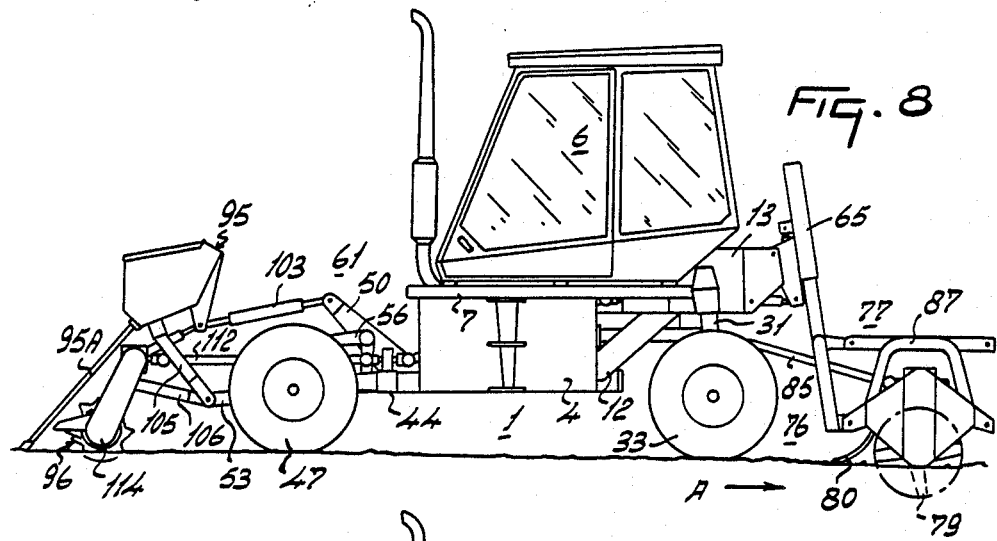
Figure 9:
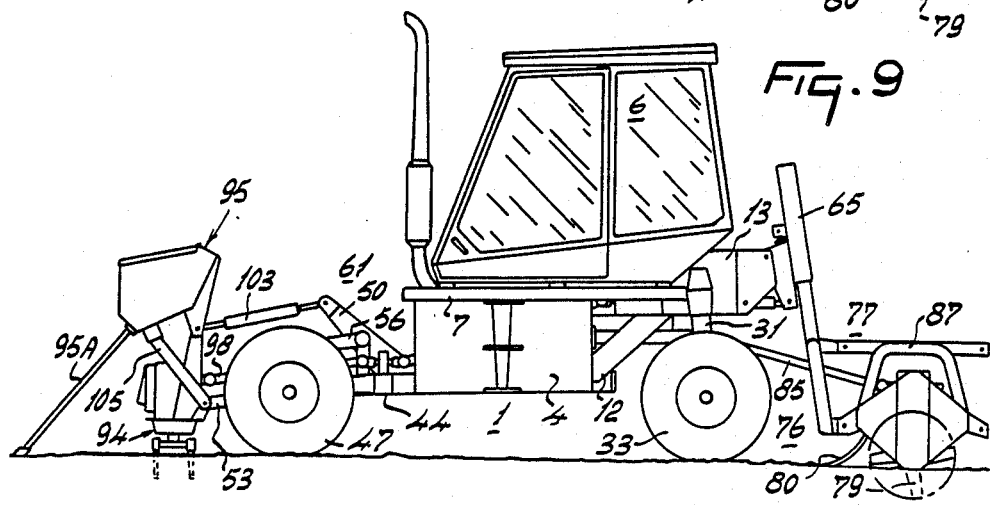

FIGS. 7 to 9 show further potential agricultural machinery combinations on the basis of the same prime mover. In FIG. 7 the soil cultivator shown in FIG. 4 is attached to the rear of the tractor by using in this case the three front fastening holes 92, 93 not used in the arrangement of FIG. 4. In FIG. 8, the soil cultivator 77 is arranged on the front lifting device 76 in the same manner as is shown in FIG. 4, but only the seed drill 95 and the drivable roller 96 are fastened to the rear lifting device 61, in which combination a relatively rigid disposition of the coupling points at the lower ends of the supporting beams 105 and the supports 108A with respect to the rest of the seed drill is employed.

FIG. 9 shows the soil cultivator 77 attached to the front of the tractor, with a combination of the harrow 94 and the seed drill 95 attached to the rear.

In this way the following combinations may be made:
1. Prime mover with seed drill.
2. Prime mover with roller and seed drill.
3. Prime mover with rotary harrow and roller.
4. Prime mover with rotary harrow and seed drill.
5. Prime mover with rotary harrow, roller and seed drill.
6. Prime mover with cultivator, roller and seed drill.
7. Prime mover with cultivator, rotary harrow and seed drill.
8. Prime mover with cultivator, rotary harrow, roller and seed drill.
9. Prime mover with cultivator at the front of the prime mover.
10. Prime mover with cultivator at the rear of the prime mover.
11. All combinations of cultivator at the front or at the rear with other implements.

The overall length of the tractor including the agricultural machinery is about 5.2 to 7.5 times the diameter of the wheels of the tractor. The overall width of the machinery is about 2.3 to 3.3 times the diameter of the wheels of the tractor. The distance between the two rows of wheels 33 and 47, measured at the rotary axes, is about equal to the length of the longer row of wheels.

During operation the engine 10 drives the change-speed and differential gear box 13 through the gear wheels 15 to 18, from where the front wheels 33 are driven with a transmission ratio as desired by the driver, determining the travelling speed. The output of the gear box also drives the drive shaft 49 at a rotary speed which is proportional to the travelling speed. The drive shaft 22 is driven and hence the auxiliary shaft 100 are driven through the gear wheels 15, 16, 19, 20 and 21 (FIG. 3) by means of which the soil cultivating implements themselves or other types of implements can be driven at a speed proportional to that of the engine 10.

By actuating the hydraulic ram 38 (FIG. 2) the front wheels can be steered about the centerlines of the tubular supports 31, which operate as king pins. The maximum angle of tune of the front wheels from the position shown in FIG. 2 (corresponding to straight-ahead travel) is about 90° to one side, so that a total lock-to-lock turn of the front wheels about the king pins of about 150° is obtainable. The geometry of the wheel control by means of the steering plate 36 and the steering rods 35 and the levers 34 is such that the center of rotation of the tractor when turning at full lock is located inside the outer boundary of the tractor, as viewed on plan. The very small turning circle is an advantage when maneuvering at the headland of a field.

By actuating the hydraulic ram 67 the position of the front three-point lifting device 76 can be adjusted with respect to the ground by turning it about the pivotal shaft 63. This facilitates the coupling of machines or implements, since it is not necessary to adjust coupling points such as the top rods. The whole lifting device 76 can be displaced up and down by means of the ram 69 along the centerline of the tube 65. The rams 67 and 69 can be actuated from the driver's cab.

By actuating the hydraulic ram 59, the lever 58 is turned about the shaft 55, which is rigidly fixed with respect to the beam 44. At the same time, the lever 56, which is rigidly fixed with respect to the lever 58, is pivoted about the shaft 55 so that the lower lifting arms 53 of the three-point lifting device 61 can be moved upwards and downwards, through the lifting arms 57.

Drive to implements coupled to the lifting device 76 is transmitted by the auxiliary shaft 85, which can be connected to the front end of the drive shaft 22. The auxiliary shaft 100 coupled to the rear end of the drive shaft 22, the length of shaft 99 and the auxiliary shaft 98 transmit drive to the input shaft of the rotary harrow 94.

The output shaft 26, which can be driven from the gear box 13 at a speed proportional to the travel speed, via drive shafts 48 and 49 and the auxiliary shaft 112 (FIG. 4), is drivably connected to the input shaft 111 of the drivable roller 96 and also can be drivably connected by means of a belt or chain transmission (not shown), to the seed drill 95. The gear box 110 and the drive shaft 113 of the roller 96 provide drive through the chain transmission in the driving casing 114, to the main shaft 115 to rotate it at a speed substantially corresponding to the travel speed of the tractor or at a slightly higher speed. The main shaft 115 is tubular and is provided with a row of cutting blades having transverse extensions 121, this row extending over the entire width (about three meters) of the machine. The effective width of the seed drill 95 and that of the rotary harrow also correspond to that dimension. Driving the extensions 121 from the power take-off shafts produces a soil cultivation in addition to the preceding cultivation and also creates a tractive force for the machinery as a whole in addition to the tractive force exerted by the drivable wheels so that the tractive force exerted by the wheels 33 and hence the ground pressure may be lower than it would have to be if the drivable roller were not present. Under bad soil conditions the roller 96 can contribute significantly to the advancement of the machinery because it is driven with a small amount of slip compared with that of wheels driven through differential gearing. For this purpose the radial dimensions of the extensions 121 may be comparatively large. During operation the tubular shaft 115 carrying the extensions can bear on the ground and be kept clean by scrapers 123, which are fastened to a frame beam 122 disposed behind the rotatable roller and extending along the entire width of the roller. The scrapers 123 extend from the beam 122 forwardly and downwardly between the axially directed extensions to bear on the periphery of the tubular shaft. The distance of the cutting edges from shaft 115 is approximately equal to the distance between the cutting edges.

Since the ends of the lower lifting arms 53 fastened to the rest of the tractor are pivotable about pivotal shafts 54, which are situated, as viewed from the side, near the boundary of the adjacent wheels, an attached implement can be vertically adjusted without greatly altering the orientation of the implement relative to the horizontal. The fact that the pivotal shaft to which the top lifting arm is coupled is also located, as viewed from the side, near a vertical plane going through the wheel boundary also contributes to this effect.

The machines are coupled to the rear lifting device 61 in a way which enables these machines together with the lifting device 61, the rear wheels 47, the carriers 45 and the beam 44 to pivot as a whole about a horizontal axis extending in the direction A (the centerline of the tube 2) with respect to the rest of the tractor and also with respect to any machine fastened to the front lifting device 76. It is, of course, also possible to fasten more machines to the lifting device 76 in the same manner as is described with reference to the rear lifting device 61.

The tractor shown in FIGS. 1 to 3 may have a relatively low weight by using wheels of relatively small diameter, since the wheel weight increases or decreases respectively mainly with the square of the wheel diameter. The frame of the machine has a very low weight since it comprises mainly the tube 2 with supports 3 for the engine and the fuel tank and supports 12 for the gear box 13 and a lightweight frame part 5 for the cab 6. With this construction it is possible for the weight of the tractor or prime mover to be about 3500 kilograms. The power of the engine 10 can be limited to about sixty kilowatts, preferably about fifty kilowatts.

The pneumatic tires of the wheels 33 and 47 are low-pressure tires having low profiles of a height of about five centimeters when using low-pressure tires with low profiles the contact surface of each tire with the ground is appreciably wider than the nominal width of the tire so that a large ground contact surface is obtained.

Since the tractor or prime mover is provided with eight wheels, the tracks of which either do not overlap at all or overlap only slightly, a large contact area for the weight of the tractor on the ground is obtained. This, combined with the low weight of the tractor, means that the ground pressure is very low. In this way the soil structure below the tractor remains intact without adverse effect on the subsequent growth of crops.

The distribution of the tractor weight is such that most of the weight is carried on the drivable front wheels 33. The weight of the engine and of the fuel tank is applied midway between the two rows of wheels 33 and 47, whereas the weight of the change-speed and differential gear box as well as the major part of the weight of the cab is carried by the front wheels in order to obtain a high tractive force. Moreover, the front lifting device 76 and the machines attached to it are disposed near the front wheels 33.

The fact that the row of rear wheels 47 and the machines attached to the rear lifting device 61 are freely pivotable with respect to the rest of the tractor about the axis of the tube 2 means that the drivable wheels 33 remain permanently in contact with the ground.

The tractor described above is a prime mover for driving agricultural machinery which may be a combination of several implements of various kinds. The tractor is a prime mover particularly suitable for soil cultivation. The combination of prime mover and implements is in particular suitable for soil cultivation in spring and sowing autumn-plowed land (owing to the low ground pressure) as well as to working stubble fields and soil cultivation in autumn and sowing.

Owing to the low tractor weight, significant fuel economy is obtained, particularly when the tractor travels on plowed soil.

The soil is less compressed and hence the yield of crop is enhanced. With the many wheels of the tractor forming a substantially continuous row, viewed from the front, loose earth is uniformly and slightly consolidated, while wheel tracks are avoided.

Driven implements can propel themselves so that lower tractive force is required from the tractor wheels.

This results in a tractor of relatively low weight and hence a low cost price, while the crop yield is increased and less fuel is consumed.

Although various features of the tractor and machinery described and illustrated in the drawings, will be set forth in the following claims as inventive features, that the invention is not necessarily limited to these features and may encompass all patentably novel features disclosed both individually and in various combinations.

Having disclosed my invention, what I claim as new and to be secured by Letters Patent of the United States is:

1. Agricultural implements for use in a combination of at least two agricultural implements each having means for connecting it to a lifting device having three lifting arms, wherein each of said implements comprises an extending frame, three forked connection means extending from said frame of each of said implements, each of said forked connection means having a forked end comprising two tines which are adapted to receive therebetween an outwardly extending end of one of said lifting arms of said lifting device, a corresponding connecting pin received across each of said forked ends for attaching between said tines said outwardly extending end of a corresponding one of said lifting arms of said lifting device, each of said connecting pins concurrently receiving two of said tines of one of said forked ends of one of said implements and also two of said tines from one of said forked ends of at least one additional one of said implements for connecting all of said agricultural implements concurrently to said three lifting arms with all of said forked connection means directly engaging a corresponding one of said connecting pins.

2. Agricultural implements for use in a combination of at least two implements for performing agricultural operations, each said agricultural implement being adapted for concurrent connection to a lifting device with three lifting arms, each of said agricultural implements comprising three separate support means for direct connection to a respective one of said three lifting arms of said lifting device, each said separate support means of a first one of said agricultural implements being adapted to accommodate the corresponding separate support means of an additional one of said agricultural implements so that each pair of said corresponding separate support means of said first and said additional agricultural implements can be simultaneously connected to said respective one of said three lifting arms of said lifting device, a corresponding connection pin connected to each said pair of said corresponding separate support means, each said separate support means comprising:

a fork, each said fork having two tines, the forks of said additional agricultural implement having said tines separated a greater distance than the tines of the corresponding one of said forks of said first agricultural implement so that said fork of said corresponding separate support means of said additional agricultural implement straddle said fork of said corresponding separate support means of said first agricultural implement in their connection to said corresponding pin for connecting both of said implements concurrently to one of said three lifting arms of said lifting device.

3. The combination of claim 2 wherein each said separate support means comprises a supporting beam connected to a corresponding said fork, each said supporting beam of one of said implements being inclined as seen from the side relative to each of said supporting beams of said separate support means of the other said implement.

4. An agricultural implement in accordance with claim 1 wherein said connection means forms, as viewed from the side together with part of one of said implements, a triangular structure which imparts strength and rigidity to the connection of the agricultural implements to each other.

5. A combination comprising:
at least two agricultural implements;
a three point lifting device with three lifting arms;
three forked connecting elements each with forked ends mounted on each of said agricultural implements;
a separate corresponding connecting pin received by each of said arms of the lifting device; and
the forked end of each of the three said forked connecting elements of each of said agricultural implements being concurrently received on one of said connecting pins of the lifting device with one of the forked ends of the forked connecting elements of the other of said agricultural implements so that the agricultural implements may be used in combination but are supported independently of one another.

* * * * *